(No Model.)

M. ABT.
VALVE.

No. 587,632.   Patented Aug. 3, 1897.

WITNESSES:
Donn Twitchell
C. R. Ferguson

INVENTOR
M. Abt
BY
ATTORNEYS.

UNITED STATES PATENT OFFICE.

MATHEW ABT, OF NEW YORK, N. Y.

VALVE.

SPECIFICATION forming part of Letters Patent No. 587,632, dated August 3, 1897.

Application filed March 2, 1897. Serial No. 625,737. (No model.)

*To all whom it may concern:*

Be it known that I, MATHEW ABT, of New York city, in the county and State of New York, have invented a new and Improved Valve, of which the following is a full, clear, and exact description.

This invention relates particularly to valves for steam-heating radiators; and the object is to provide a simple and effective means whereby both the inlet and outlet valves may be simultaneously operated, thus obviating any possible danger that might arise from leaving one valve open and the other closed.

I will describe a valve embodying my invention, and then point out the novel features in the appended claims.

Reference is to be had to the accompanying drawings, forming a part of this specification, in which similar characters of reference indicate corresponding parts in both views.

Figure 1:
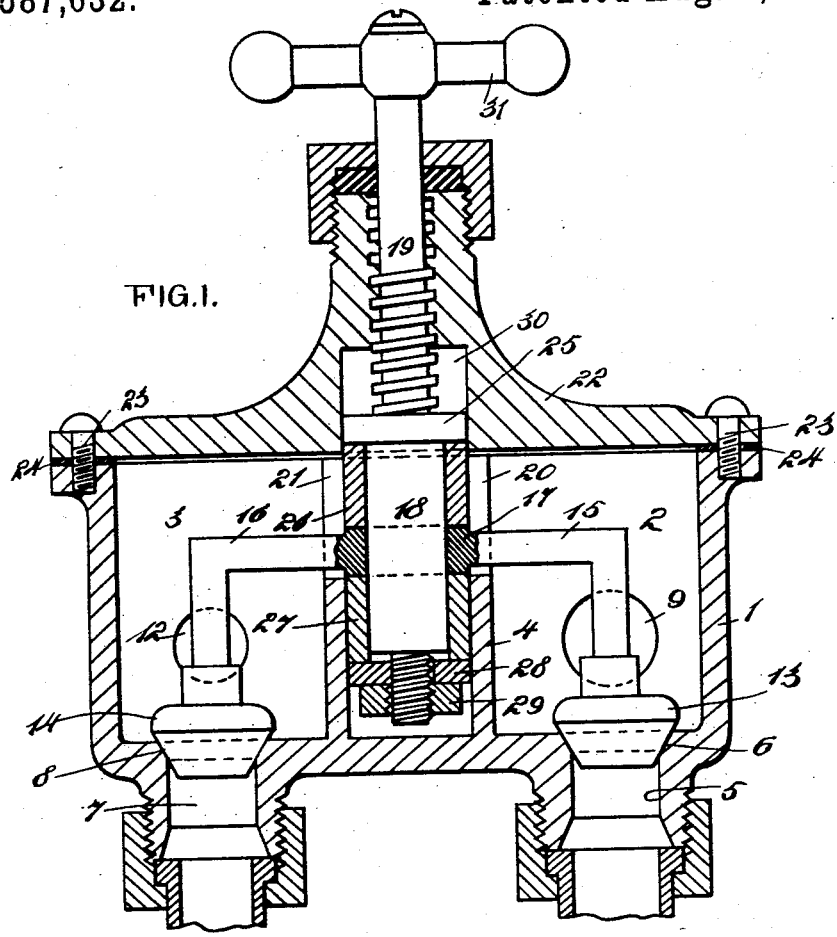
Figure 2:
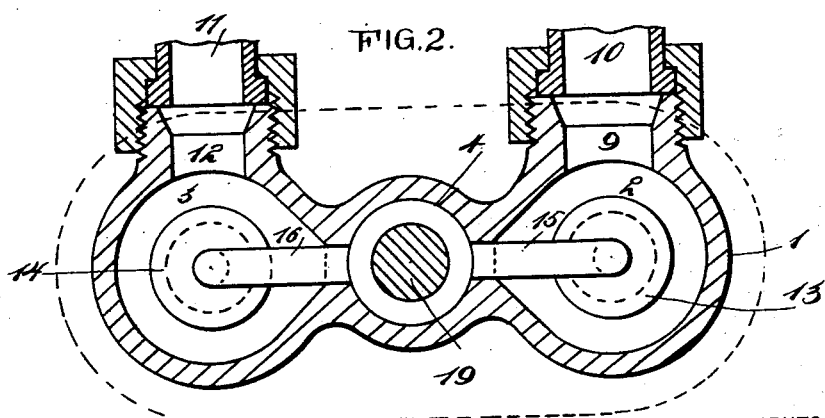

Figure 1 is a vertical section of a valve embodying my invention, and Fig. 2 is a transverse section thereof.

Referring to the drawings, 1 designates a valve-casing having two chambers 2 and 3, separated by a tubular extension in the center of the casing 4. Leading into the chamber 2 is a steam-inlet 5, having a valve-seat 6, and leading from the chamber 3 is an outlet 7, having a valve-seat 8. From the chamber 2 the steam-inlet 9 extends to a connection with a radiator-pipe 10, and a return-pipe 11 has a connection with the inlet 12 of the chamber 3. The several inlet and outlet pipes will be connected to the valve-casing by means of suitable couplings, as indicated in the drawings.

Arranged to engage in the valve-seat 6 is a plug-valve 13, and a similar valve 14 is provided for the valve-seat 8. These valves 13 and 14 are connected, respectively, to arms 15 and 16, extended horizontally and then downward from a ring 17, within which the lower end portion 18 of the valve-stem 19 may rotate. The arms 15 and 16 project through vertical slots 20 and 21 in the opposite sides of the tubular extension 4. The valve-stem 19 has a screw-threaded portion engaging in a tapped hole in a bonnet 22 on the valve-casing. I preferably secure the bonnet 22 to the valve-casing by means of screws 23, extended through openings near the edge of the bonnet and engaging in tapped holes in a flange formed on the upper portion of the valve-casing, and to secure a tight joint between the bonnet and casing I employ a gasket 24 of rubber or similar packing material.

Arranged between an annular collar 25 on the valve-stem 19 and the ring 17 is a sleeve 26, and a similar sleeve 27 is arranged on the lower portion of the body 18 of the valve-stem 19 between the ring 17 and the washer 28, which is held in place by means of a nut 29 engaging with the threaded portion at the lower end of the stem portion 18. These sleeves 26 and 27 engage tightly yet movably in the tubular extension 4 and form valve-closures for the slot-openings 20 and 21, thus preventing the discharge of steam from one chamber to the other through said slot-openings. The bonnet 22 is provided with a recess 30 to allow for the upward movement of the valve-stem.

In operation it will be seen that by rotating the handle 31 on the valve-stem 19 the valves 13 and 14 may be raised to open the steamways or may be closed onto their seats.

It will be apparent that this valve is of very simple construction, and therefore not liable to get out of order, and as the valves are simultaneously operated by a single valve-stem there can be no danger of leaving one valve closed and the other open, which might cause an explosion or leakage. The slots 20 and 21 will extend through the upper end of the tubular extension 4, so that by removing the screws screwing the bonnet to the casing the valves may be lifted from the casing, when desired.

Having thus described my invention, I claim as new and desire to secure by Letters Patent—

1. A valve, comprising a casing having two chambers, a tubular extension separating said chambers and having opposite slot-openings, a valve-stem, a ring surrounding said valve-stem, arms extended from said ring, and valves carried by the arms and adapted for engagement with the valve-seats of inlet and outlet openings, the lower portion of the valve-stem serving as a valve or closure for the slot-openings through the tubular extension, substantially as specified.

2. A valve, comprising a casing having two chambers, a tubular extension within the casing separating said chambers, a bonnet on the casing, a screw-threaded valve-stem extended through the valve and having an enlarged portion extended into the tubular extension, a ring on said enlarged portion, arms extended from the ring through slot-openings in the tubular extension, inlet and outlet controlled valves carried by said arms, and sleeves on the enlarged portion of the valve-stem, forming closures for the slot-openings in the tubular extension, substantially as specified.

3. A valve, comprising a casing having two chambers, a tubular extension within the casing separating the chambers, a valve-stem having an enlarged portion extended into the tubular extension, a ring on said enlarged portion, arms extended from the ring through slot-openings in opposite sides of the tubular extension, inlet and outlet controlled valves carried by said arms, a sleeve on the enlarged portion of the valve-stem and arranged between an annular collar on the valve-stem and the ring, a sleeve on the enlarged portion of the valve-stem below said ring, and a nut for holding said parts on the enlarged portion of the valve-stem, substantially as specified.

MATHEW ABT.

Witnesses:
JNO. M. RITTER,
C. R. FERGUSON.